LEARNED & HUGHES.
Mill Bolt.
No. 6,902.
2 Sheets—Sheet 1.
Patented Nov. 27, 1849.
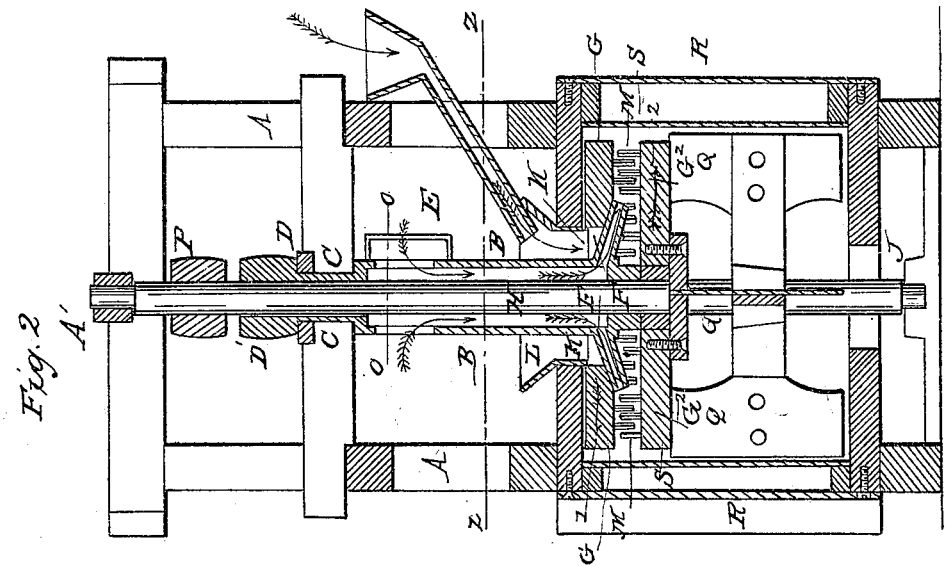
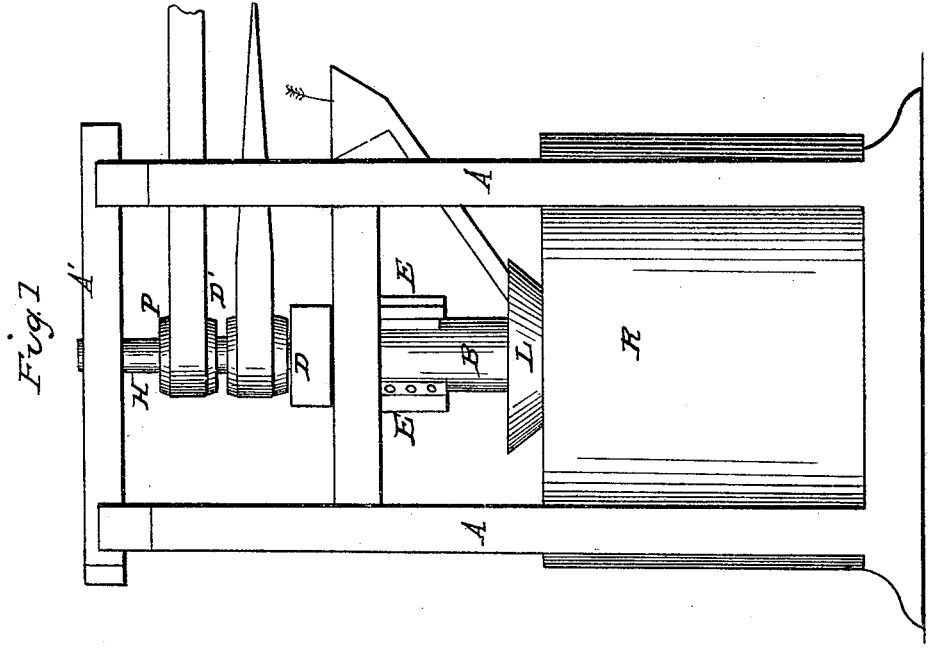

LEARNED & HUGHES.
Mill Bolt.
No. 6,902.
2 Sheets—Sheet 2.
Patented Nov. 27, 1849.
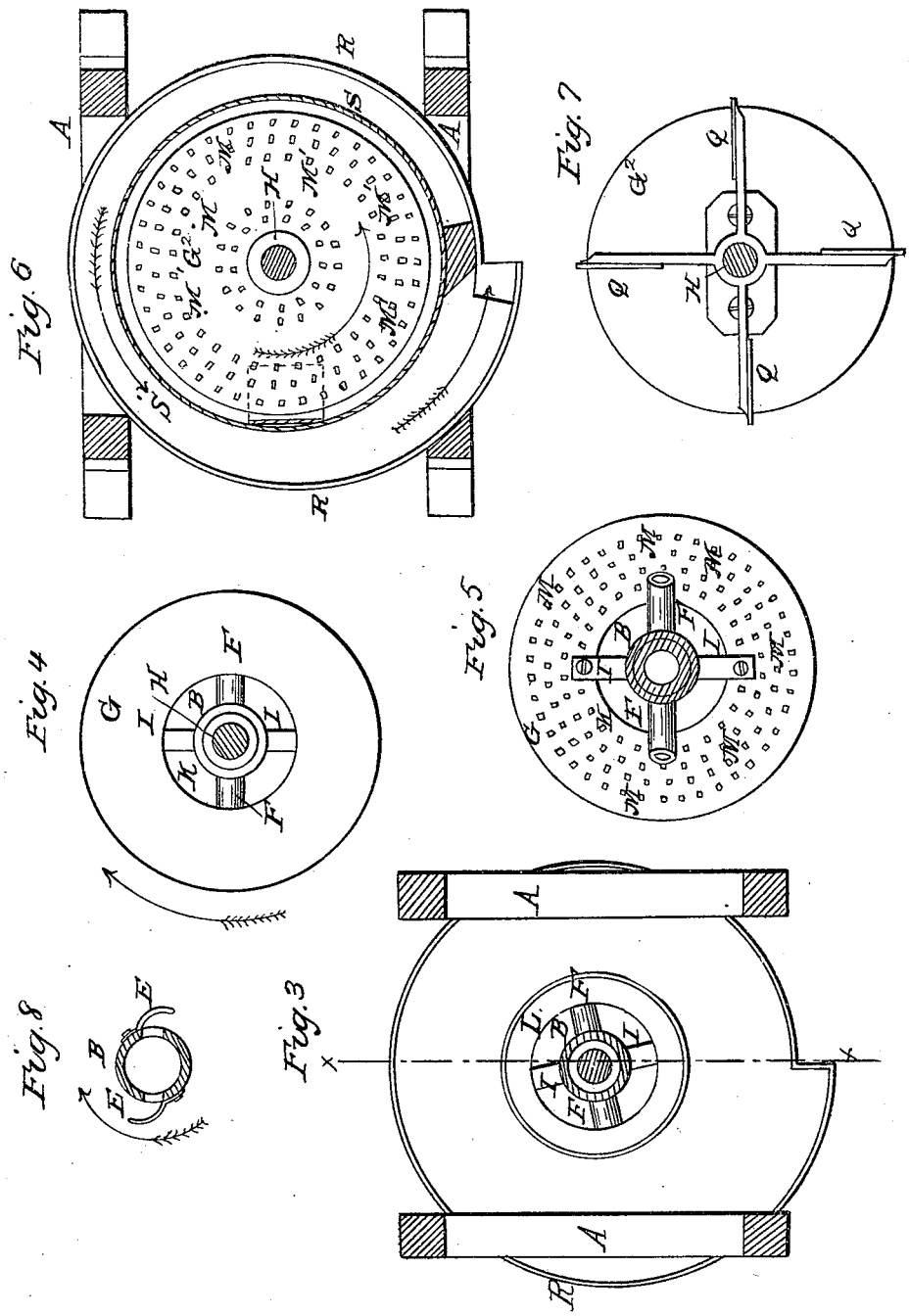

UNITED STATES PATENT OFFICE.

CHAS. LEARNED AND STEPHEN HUGHES, OF INDIANAPOLIS, INDIANA.

IMPROVEMENT IN MACHINERY FOR DRESSING FLOUR.

Specification forming part of Letters Patent No. 6,902, dated November 27, 1849.

*To all whom it may concern:*

Be it known that we, CHARLES LEARNED and STEPHEN HUGHES, of the town of Indianapolis, in the county of Marion and State of Indiana, have invented a new and useful improvement in the machine for separating bran from flour which is found adhering to it after coming from the usual flouring-bolts, called the "Indiana bran-separator," which is described as follows, reference being had to the annexed drawings of the same, making part of this specification.

Figure 1 is an elevation of the machine. Fig. 2 is a vertical section on the line $x$ $x$ of Fig. 3. Fig. 3 is a horizontal section on the line $z$ $z$ of Fig. 2. Fig. 4 is a plan of the upper revolving cylindrical beaters. Fig. 5 is a view of same inverted, showing the concentric rows of beaters or pins. Fig. 6 is a plan of the lower revolving cylinder of beaters or pins. Fig. 7 is a view of same inverted, showing the arrangement of the concentric rows of metallic beaters, which turn in a contrary direction in the spaces between the concentric rows of the upper cylinder aforesaid. Fig. 8 is a horizontal section on the line $o$ $o$ of Fig. 2.

The arrows 1 and 2 show the direction of the revolving of the cylinders of beaters.

Similar letters in the several figures refer to corresponding parts of the machine.

The nature of our invention and improvement consists in separating the fine flour that usually is found adhering to the bran after passing through the flour-bolts, and which is usually lost to the superfine-barrel, by conducting the bran by an inclined spout through the eye of an upper revolving cylinder of metallic beaters to a space between it and a lower revolving cylinder of beaters, turning in an opposite direction, where it is struck by a number of concentric rows of four-sided metallic teeth projecting vertically from the adjacent surfaces of the two opposing cylinders, and separated from the bran and driven by centrifugal force against a stationary cylindrical bolting-cloth surrounding the revolving cylinders, through which the flour is driven aided by a current of air gathered into and passing down through the shaft of the upper cylinder (which is made hollow and suspended by a neck) to the space between the cylinders, the flour being collected in a scroll-shaped chamber surrounding the cylindrical bolt, which gradually enlarges in its circuit to the outlet, where the flour is discharged in a tangential line to the circle of the cylinder-bolt into a suitable conducting-spout, while the bran and flour that failed to pass through the cloth above are again acted on by radial wings affixed to the under side of the lower cylinder, causing the remaining flour to pass through the cloth into the scroll-space, while the bran descends to the bottom of the cylinder-bolt, in which there is a discharge-opening through which it passes to a proper receiver, the aforesaid cylinders being turned by bands and pulleys connected with any suitable and adequate propelling-machine at the rate of about eight hundred revolutions per minute.

A is a suitable frame.

B is a hanging hollow shaft, closed at its upper and lower ends and supended to the central cross-timber of the frame by means of a neck, $c$, and head D, which turns in a suitable box let into said cross-timber. Two curved induction-tubes, E, or wind-gatherers, are inserted into this hollow shaft, near its upper end on opposite sides, for gathering in the air and forcing it downward through two tangential eduction-tubes, F, inserted into the sides of the said hollow shaft near the lower end thereof on opposite sides, for conveying the air between the cylinders and discharging the same in two tangential streams among the metallic beaters and cutters.

G is the upper revolving cylinder, made of any convenient length and diameter, attached to the hollow hanging shaft B by means of two arms, I I, cast on the periphery of the same, and bolted to the under side of the cylinder. The hollow arms or eduction tubes F are also fastened to the under side of said cylinder. This cylinder has a round opening or eye, $k$, in its center of greater diameter than the hollow shaft, so as to form an annular space around the hollow shaft for the introduction of the feeding-funnel L. The four-sided metallic beaters or cutters M, for cutting the flour from the bran and driving it through the cylindrical bolt, are inserted into the cylinder in concentric rows, as represented in Fig. 5. The hollow shaft has a pulley, D', on its upper end, around which is passed a band crossed, and leading to the drum of the driving-power, for turning the suspended cylinder G to the right. The lower cylinder, $G^2$, is made solid, of the same diameter and length as the upper suspended cylinder, G, and is fixed to a long upright shaft, H, which turns in a box, J, fixed to a bridge-tree below, and passes up through the hollow shaft B, turning in a round aperture or bearing in the head or cap timber of the frame at A', and provided with a pulley, P, near its upper end, around which a band passes (which is not crossed) leading to the driving-power for turning the lower cylinder in a contrary direction to the upper one. This cylinder is also armed with a number of concentric rows of metallic beaters, M', and cutters rising from its face parallel and vertical, and so arranged as to turn in the spaces between the rows of the upper cylinder without touching them, those of the lower cylinder being opposite the radial spaces between the cutters of the upper cylinder. Four radial wings, Q, are fixed to the under surface of the lower cylinder for driving the flour through the bolting-cloth. Brushes may be inserted into the peripheries of the cylinders to facilitate the bolting operation. The cylindrical bolting-cloth S must be of greater diameter than the revolving cylinders, and be closed at top and bottom, except in the center, where round openings are left for admitting air, bran, and flour. Another opening is also made in the bottom, between the center and periphery, for the discharge of the bran. The air that passes through the upper opening is that which is conducted by the hollow shaft, and a portion mixed with the bran and flour. The lower opening of the case admits the shaft of the lower cylinder to pass through, and also an annular column of air, which may be regulated at pleasure with the usual description of slides or valves. The cylindrical bolting-cloth is then surrounded with a sheet of zinc, R, or other suitable material, bent in the form of a helix, for the purpose of making a space between the said helical plate and the cylindrical bolting-cloth in the form of a spherical triangle in its horizontal section, for the purpose of increasing the current of wind in said space from the narrow to the wide end or outlet, so as to discharge the flour horizontally at a single opening, and more freely than if the space was made of uniform width. The top and bottom of this space are closed.

We make no claim to the arrangement of the bolting-cloth and the other parts that are in other bran-dusters in use.

Having described the construction of our improved machine for separating the flour adhering to the bran after the usual bolting operation has been performed in flouring-mills, what we claim as our invention, and desire to secure by Letters Patent, is—

1. The employment of a revolving hanging disk of concentric rows of metallic polygonal beaters or cutters, and central hollow suspended shaft, made with curved induction and eduction branch tubes, said hollow shaft serving a double purpose of a hanging shaft and air-conductor for conveying streams of air to the space between the cylinders, in combination with a revolving disk, turning in a contrary direction, also armed with concentric rows of metallic polygonal beaters and cutters and radial wings, arranged and operating in the manner and for the purpose herein fully set forth.

2. The employment of the helical plate, in combination with the cylindrical bolt for producing the gradually-enlarged space into which the flour is received and from which it is discharged, in the manner herein described.

In testimony whereof we have hereunto signed our names before two subscribing witnesses.

CHARLES LEARNED.
STEPHEN HUGHES.

Witnesses:
 A. E. H. JOHNSON,
 LUND WASHINGTON.